ns Patent [19]

Brunetti et al.

[11] 3,821,310
[45] June 28, 1974

[54] 1,3-BIS-(2'-HYDROXYBENZOYL)-BENZENES

[75] Inventors: Heimo Brunetti, Reinach; Hans-Jakob Peterli, Fullinsdorf; Helmut Müller, Binningen; Hansjorg Heller, Riehen, Basel, all of Switzerland

[73] Assignee: Ciba-Geigy Corporation, Ardsley, N.Y.

[22] Filed: Nov. 3, 1971

[21] Appl. No.: 195,493

Related U.S. Application Data

[63] Continuation-in-part of Ser. No. 878,870, Nov. 21, 1969, abandoned.

[52] U.S. Cl.......... 260/591, 260/45.75, 260/2.5 BB, 106/188
[51] Int. Cl............................................. C07c 49/44
[58] Field of Search.................................. 260/591

[56] References Cited
UNITED STATES PATENTS

| | | | |
|---|---|---|---|
| 2,773,903 | 12/1956 | Hardy et al. | 260/591 |
| 2,777,828 | 1/1957 | Day et al. | 260/591 |
| 2,861,053 | 11/1958 | Lappin et al. | 260/591 |
| 2,890,201 | 6/1959 | Hardy | 260/591 |
| 3,113,121 | 12/1963 | Hoch et al. | 260/591 |
| 3,395,115 | 7/1968 | Milionis et al. | 260/591 |

FOREIGN PATENTS OR APPLICATIONS

| | | | |
|---|---|---|---|
| 1,959,404 | 6/1970 | Germany | 260/591 |
| 1,959,399 | 6/1970 | Germany | 260/591 |

*Primary Examiner*—Daniel D. Horwitz

[57] ABSTRACT

1,3-bis-(2'-hydroxybenzoyl)-benzenes are stabilizers of organic material. The compounds are obtained through dealkylating of the corresponding ethers.

8 Claims, No Drawings

1,3-BIS-(2'-HYDROXYBENZOYL)-BENZENES

CROSS-REFERENCE

This is a continuation-in-part of copending application Ser. No. 878,870 filed Nov. 21, 1969 now abandoned.

DESCRIPTION OF THE INVENTION

The present invention relates to new 1,3-bis-(2'-hydroxybenzoyl)-benzenes, their application as protective agents against light rays, e.g., as a constituent of light-ray filters or for the stabilising of light-sensitive organic material; processes for the production of the new compounds and, as an industrial product, the organic materials stabilised with the aid of the new compounds, as well as light filters containing the new compounds.

It has been found that 1,3-bis-(2'-hydroxybenzoyl)-benzenes of the general formula I

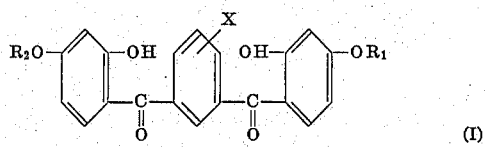

(I)

wherein $R_1$ and $R_2$ represent, independently of each other, alkyl having six to 22 carbon atoms, alkenyl having three to 18 carbon atoms or benzyl, alkyl substituted benzyl wherein the alkyl substituent has one to four carbon atoms, or chlorine substituted benzyl and if both of $R_1$ and $R_2$ are carbon atoms containing radicals, the sum of the carbon atoms in $R_1$ and $R_2$ together is at least 4, and X represents hydrogen or chlorine.

The alkyl groups denoted in the formula I by $R_1$ and $R_2$ are, e.g., hexyl, octyl, decyl, dodecyl, tetradecyl, hexadecyl, octadecyl or docosyl groups, whereby the alkyl groups can be branched or unbranched. As alkenyl group, $R_1$ and $R_2$ represent, e.g., the $\Delta^1$- or $\Delta^2$-propenyl group or the $\Delta^8$-heptadecenyl group.

If the benzyl group is further substituted by alkyl, it can be a question of the methyl, ethyl, propyl, butyl or tert. butyl group.

If both of $R_1$ and $R_2$ are carbon atoms containing radicals, the sum of the carbon atoms in $R_1$ and $R_2$ together should be at least four, since it is only compounds having at least this number of carbon atoms in the substituents $R_1$ and $R_2$ which ensure a good compatibility with the substrates.

Particularly suitable as protective agents against light rays are compounds of the formula I, wherein $R_1$ and $R_2$ represent alkyl having six to 22 carbon atoms, alkenyl having three to four carbon atoms such as, e.g., $\Delta^2$-propenyl or methallyl groups, or the benzyl group.

Amongst the particularly suitable compounds of the formula I, those are preferred, wherein $R_1$ and $R_2$ are identical and represent alkyl having six to 22 carbon atoms, or alkenyl having three to four carbon atoms.

Especially preferred are compounds of the formula I, wherein $R_1$ and $R_2$ are alike and represent alkyl having six to 12 carbon atoms such as the hexyl, octyl, decyl or dodecyl group or $R_1$ is hydrogen and $R_2$ is an alkyl having six to 12 carbon atoms.

Compared with simlar protective agents against light rays known hitherto, the new compounds of the formula I are characterised by a low degree of inherent colour, improved fastness to sublimation, better fastness to light and better compatibility with respect to the substrates. These unexpected propterties have especially those compounds of the formula I wherein $R_1$ and $R_2$ are alkyl of from six to 22 carbon atoms. They show particularly a better compatibility with respect to the substrates than similar compounds having as $R_1$ and $R_2$ lower alkyl. The new cmpounds are therefore particularly suitable as protective agents against light rays in the case of substrates which are further processed at elevated temperature.

The compounds in which both $R_1$ and $R_2$ are organic radicals are particularly useful in non-polar substrates such as polyolefines, due to their good compatibility with hydrocarbon substrates. The compounds in which $R_1$ is hydrogen on the other hand are particularly valuable as protective agents for polar substrates as used mainly in the coating field. An enhanced compatibility with polar substrates is obtained if $R_2$ in such compounds contains a small sumber of carbon atoms.

The new compounds of the formula I are introduced into the light-sensitive carriers or into the light filters in amounts of 0.01 to 30 percent. The amount to be added of the new compounds is governed, amongst other factors, by the thickness of the light filters being produced. For very thin layers, e.g., in the case of lacquer coatings, amounts of 1 to 20 percent are preferred but for thick layers such as, e.g., in polymethacrylate sheets, amounts of 0.01 to 1 percent are preferred.

Suitable as carrier materials for the new compounds are primarily organic polymers, both thermoplastic polymers and curable synthetic resins (thermosetting polymers). Thereby applicable are fully synthetic polymers and also natural polymers as well as their polymer-homologous chemical modification products. Appropriate amongst the fully synthetic polymers are pure addition polymers and pure condensation polymers, but also condensation polymers cross-linked by addition polymerisation.

The addition polymers coming into consideration as carrier materials for the new protective agents against light rays, can be classified under the following main typs:

1. Homopolymers and copolymers of vinyl- and vinylidenemonomers, which are converted by radical, ionic or metal-organic polymerisation initiators into the corresponding polymers. Examples of such monomers, the polymerisates of which are suitable as carrier materials are:

Polymerisable, ethylenic, unsaturated halogenated hydrocarbon compounds such as, e.g., vinyl chloride, vinyl fluoride and vinylidene chloride, polymerisable hydrocarbons with double bonds capable of addition such as, e.g., styrene, isobutylene, ethylene, propylene, 1-butene, 3-methyl-1-butene and 4-methyl-1-pentene, whereby both the atactic and the tactic polymerisates apply, $\alpha,\beta$-unsaturated polymerisable carboxylic acids and their functional derivatives such as acrylic acid, methacrylic acid, acrylonitrile, alkyl esters and amides of acrylic and methacrylic acid, e.g., the methyl, ethyl and butyl esters of methacrylic acid and acrylic acid, polymerisable acyl derivatives of ethylenic unsaturated alcohols and amines, whereby are suitable acyl radicals of alkane— and alkene-carboxylic acids having up to 18 carbon atoms and of aromatic monocyclic carboxylic acids, such as benzoic acids and phthalic acids, as well as acyl radicals of cyclic carbonic acid imides such as, e.g. those of cyanuric acid. Examples are: allyl phthalate, polyallyl melamines, vinyl acetate, vinyl stearate, vinyl benzoate and vinyl maleate, polymerisable polyenes with conjugated double bonds such as butadiene, isoprene, chloroprene, sorbic acid and esters thereof.

2. Homo- and copolymers of epoxides which are obtained by acid- or base-catalytic thermosetting. Suitable in this class are, e.g., the polymerisates of the bisglycidyl ethers of the geminal bis-(p-hydroxyphenyl)-alkanes and cycloalkanes.

3. Homopolymers and copolymers of lactams and lactones such as, e.g., the polymerisates of ε-caprolactam or lauryllactam.

4. Homopolymers and copolymers of aldehydes such as, e.g., of formaldehyde and acetaldehyde, such as the polyoxymethylene and the polyoxyethylene.

5. Reaction products of isocyanates with hydroxyl and/or amino compounds such as, e.g., those of di- or polyisocyanates with bivalent or polyvalent hydroxyl or amino compounds. Belonging to this class are also the polyurethanes and polyureas which are obtained by reaction of diisocyanates with polyesters and/or polyethers containing hydroxyl groups.

The condensation polymers suitable as carrier materials for the new compounds are, amongst others, polyesters and polyamides. To be mentioned in this respect are linear thermoplastic poly- and copolycondensates, which are derived from dicarboxylic acids and organic dihydroxy derivatives or organic diamines, on the one hand, and from hydroxy or aminocarboxylic acid on the other hand. Linear polycondensates are, e.g. the fibre-forming polymers of ω,ω'-dicarboxylic acids and ω,ω'-dihydroxy compounds or ω,ω'-diamines as well as of ω-hydroxycarboylic acids or of ω-aminocarboxylic acids, which are derived from saturated aliphatic, cycloaliphatic and carbocyclic non-anellated aromatic carboxylic acids.

Suitable for the production of linear condensation products are, e.g., the following components: adipic acid-hexamethylenediamine, sebacic acid-hexamethylenediamine, adipic acid/sebacic acid-hexamethylenediamine, terephthalic acid-ethylene glycol, terephthalic acid-1,4-dimethylol-cyclohexane, 10-aminodecanecarboxylic acid.

Cross-linked polycondensates as carrier materials are hot-thermosetting and are obtained, in particular, by condensation of aldehydes with polyvalent condensable compounds. Mention is made of formaldehyde condensates with phenols, ureas and melamines.

Of the condensation polymers cross-linked by subsequent addition polymerisation are the polyester resins. These are polycondensates from at least one unsaturated organic dicarboxylic acid with polyvalent alcohols, which can be modified with saturated and/or aromatic dicarboxylic acids or their anhydrides and which can be cross-linked by addition of compounds having double bonds capable of addition. Suitable, for example, as unsaturated dicarboxylic acids are: maleic acid or its anhydride, itaconic acid, citraconic acid or fumaric acid; suitable as saturated dicarboxylic acids are the succinic, adipic, azelaic or sebacinic acids, as aromatic dicarboxylic acids the isophthalic acid or the anhydrides of the phthalic, tetrachlorophthalic or tetrabromophthalic acids and 1,2,3,4,7,7-hexachlorodicyclo-(2,2,1)-hept-2-ene-5,6-dicarboxylic acid anhydride; suitable as alcohols are ethylene, propylene, diethylene, neopentyl glycol or trimethylpentanediol, and suitable as cross-linking agents are styrene, p-chlorostyrene, diallylphthalate, methylmethacrylate, vinyl toluene or diallylcyanurate.

The natural polymers, suitable as carrier materials for the new protective agents against light rays, are, e.g., polysaccharides, such as cellulose or also rubber and proteins.

Amongst the polymer-homologous, chemically modified synthetic polymers are, e.g., the reaction products of polyvinyl alcohols with aldehydes such as polyvinyl butyral, and the saponification products of polyvinyl esters. Polymer-homologous, chemically modified natural polymers, as carrier materials for the new protective agents against light rays are, e.g., the cellulose esters and cellulose ethers, such as the cellulose esters of the acetic acid, propionic acid, benzoic acid with, on average, 1 to 3 acyl groups per unit of glucose.

The above listed polymers can also be used in the form of mixtures, as carriers of the new protective agents against light rays in the compositions according to the invention.

Particularly valuable compositions, according to the invention, contain, as carriers of the new protective agents against light rays, light-sensitive polymerisates which are derived from styrene, vinyl chloride, vinyl fluoride, acrylonitrile, olefins, acrylic acid esters and/or methacrylic acid esters, as well as polyesters, polyamides, polyester resins, polyacetals, polycarbonates, polyurethanes, cellulose ethers and cellulose esters. Especially preferred carriers are polymeric hydrocarbons such as, e.g., high- and low-pressure polyethylene, polypropylene, polybutene, poly(-3-methyl-1-butene), poly(4-methyl-1-pentene), ethylene-butene copolymers, ethylene-propylene copolymers, ethylene-propylene-terpolymers, propylene-ethylene-polyallomers.

Also suitable as carriers, in addition to these polymers, are natural as well as synthetic light-sensitive waxes, fats and oils, and also complex systems such as photographical material, emulsions containing light-sensitive fatty substances, emulsions or dispersions of the aforementioned polymers.

The molecular weight of the aforestated polymers is of secondary importance, providing that it is within the limiting values required for the characteristic mechanical properties of the polymers concerned. Depending on the polymers, it can be 1,000 to several millions.

The incorporating of the new compounds into these polymers is effected, e.g., depending on the nature of the polymers, by the introducing of at least one of these compounds, and optionally further additives, into the melt, according to methods normally applied in practice, before or during moulding, or by dissolving them in the corresponding monomer before polymerisation, or by dissolving of the polymer and/or the additives in solvents and subsequent evaporation of the latter.

Further additives are, e.g.:
Antioxidising agents such as
2,2'-thiobis-(4-methyl-6-tert.butylphenol); 4,4'-tiobis-(3-methyl-6-tert.-butylphenol); 2,2'-methylene-bis-(4-methyl-6-tert.butylphenol); 2,2'-methylene-bis-(4-ethyl-6-tert. butylphenol); 4,4'-methylene-bis-(2-methyl-6-tert.butylphenol); 4,4-butylidene-bis-(3-methyl-6-tert.butylphenol); 2,2'-methylene-bis-[4- methyl-6-(α-methylcyclohexyl)-phenol]; 2,6-di-(2'-hydroxy-3'-tert.butyl-5'-methylbenzyl)-4-methylphenol; 1,1,3-tris-(4'-hydroxy-2'-methyl-5'-tert.butylphenyl)-butane; 1,3,5-trimethyl-2,4,6-tri-(3',5'-ditert.butyl-4'-hydroxybenzyl)-benzene; esters of the β-4-hydroxy-3,5-ditert.butylphenyl-propionic acid with mono- or polyvalent alcohols such as methanol, octadecanol, hexanediol, trimethylolethane or pentaerythrite; 2,4-bis-octylmercapto-6-(4-hydroxy-3,5-ditert.butylanilion)-s-triazine; 2,4-bis-(4-hydroxy-3,5-ditert.butylphenoxy)-6-octylmercapto-s-triazine; 1,1-bis-(4-(4'-hydroxy-2'-methyl-5'-tert.butyl)-phenyl-3-dodecylmercapto-butane; 4-hydroxy-3,5-ditert. butylbenzyl-phosphonic acid ester such as the diethyl-or dioctadecyl-ester; (3-methyl-4-hydroxy-5-tert. butylbenzyl)-malonic acid-dioctadecyl ester; S-(3,5-dimethyl-4-hydroxybenzyl)-thioglycolic acid octadecyl ester; phenyl-1-naphthylamine; phenyl-2-naphthylamine; N,N'-diphenyl-p-phenylenediamine; N,N'-di-2-naphthyl-p-phenylenediamine; N,N'-di-sec.butyl-p-phenylenediamine; 6-ethoxy-2,2,4-trimethyl-1,2 -dihydroquinoline; 6-dodecyl-2,2,4-trimethyl-1,2-dihydroquinoline; mono- and dioctyliminodibenzyl; polymerised 2,2,4-trimethyl-1,2-dihydroquinoline.

UV-absorbers and protective agents against light rays such as 2-(2'-hydroxyphenyl)benzotriazoles, e.g., the 5'-methyl-, 3',5'-ditert.butyl-, 5'-tert.butyl-, 5-chloro-3', 5'-ditert.butyl-, 5-chloro-3'-tert.butyl-5'-methyl-, 3',5'-ditert.amyl-, 3'-methyl-5'-β-carbomethoxyethyl-, 5-chloro-3',5'-ditert.amyl-derivative; 2,4-bis-(2'-hydroxyphenyl)-6-alkyl-s-triazines such as the 6-ethyl- or 6-undecyl-derivative; 2-hydroxy-benzophenones such as the 4-hydroxy-, 4-methoxy-, 4-octoxy, 4-decyloxy-, 4-dodecyloxy-, 4,2',4'-tri-hydroxy- or 2'-hydroxy-4,4'-dimethoxy-derivative; phenylsalicylate; octylphenylsalicylate; benzoylrecorcin; dibenzoylresorcin; α-cyano-β-β-diphenylacrylic acid ethyl- or isooctyl ester; α-carbomethoxycinnamic acid methyl ester; α-cyano-β-methyl-p-methoxycinnamic acid methyl- or butyl ester; N-(β-cyano-β-carbomethoxy-vinyl)-2-methyl-indoline; nickel complexes of the 2,2'-thiobis-(4-ditert.octylphenol), such as the 1:1 and 2:1 complex, optionally with other ligands such as n-butylamine; nickel dibutyldithiocarbamate; nickel salts of 4-hydroxy-3,5-di-tert. butylbenzylphosphonic acid monoalkyl esters such as the methyl, ethyl or butyl ester, the nickel complex of the 2-hydroxy-4-methylacetophenoneoxime; 4,4'-di-octyloxyoxanilide 2,2'-di-octyloxy-5,5'-ditert.butyloxanilide; 2,2'-di-dodecyloxy-5,5'-ditert.butyloxanilide.

Metal deactivating agents such as
mono- and dihydrazides of monobasic and polybasic acids such as oxalic, adipic, salicylic, terephthalic or isophthalic acid; substituted oxamides and oxanilides; N-salicyloyl-salicylaldehyde-hydrazones; n-butylbenzotriazole; tetrahydrobenzotriazole; 2-guanidinobenzoimidazole.

Nucleating agents such as
4-tert.butylbenzoic acid, adipic acid, diphenylacetic acid.

Peroxide decomposing compounds such as esters of the β-thiodipropionic acid, e.g., the lauryl, stearyl, myristyl or tridecyl ester; salts of the 2-mercaptobenzoimidazole, e.g., the zinc salt; diphenylthio-urea; triphenyl phosphite; diphenylalkyl phosphites: phenyldialkyl phosphites; trinonylphenyl phosphite; trilauryl phosphite; trioctadecyl phosphite; 3,9-diisodecyloxy-2,4,8,10-tetraoxa-3,9-diphosphaspiro-(5,5)-undecane; tri-(4-hydroxy-3,5-ditert.butylphenyl)-phosphite.

Other stabilisers such as potassium, barium, cadmium, magnesium, calcium or zinc salts or organic acids, e.g., stearates or laurates; basic or neutral lead salts of organic or inorganic acids; tin-containing stabilisers such as dibutyl tin laurates, -maleates or -mercaptides; hexamethylphosphoric acid triamide; copper salts such as copper acetates or copper I- or copper II-halides, optionally in combination with alkali halides, -hydrophosphites, -phosphites and -phosphates or free phosphorous or phosphoric acid; manganese II-salts such as the chloride, hypophosphite or phosphate, optionally in combination with other hypophosphites, phosphites and phosphates; dicyanodiamide; diphenylurea.

Other additives such as softeners, antistatics, flameproofing agents, pigments, soot.

Inorganic fillers such as, e.g., asbestos, glass fibres, kaolin, talcum.

The new protective agents against light rays can also be applied to polymer granulate and to thinner carrier structures, such as to films or threads, from baths, e.g., from aqueous dispersions or from solution in organic solvents.

The light-sensitive materials can, moreover, be protected from the harmful action of light by being coated with a protective layer, e.g., with a lacquer, containing at least one defined compound of the formula I, or by being covered with materials, such as films, disks or sheets, which contain such protective agents against light rays. In these two cases, the amount of the added protective agent against light rays is advantageously 10 - +percent (relative to the protective-layer material) for protective layers of less than 0.01 mm thickness, and 1 - 10 percent for protective layers of 0.01 to 0.1 mm thickness.

In the case of certain types of application, especially where a warm plastic granulate is powdered with protective substances, products are especially valuable which melt above the softening temperature of the particular polymer, and which nevertheless are sufficiently soluble in the melted polymer.

The new compounds of the general formula I are produced, e.g., by reacting a compound of the general formula Ia

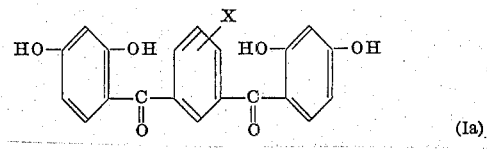

(Ia)

with 1 or 2 equivalents of an alkylating agent.

The following are mentioned as alkylating agents:
Dialkyl sulphates, 1-bromoalkanes, 1-chloroalkanes, 2-bromoalkanes, 2-chloroalkanes, 1-chloro-3,3-dimethylbutane, 1-bromohexane, 1-bromododecane or 1-bromooctadecane, benzyl chloride, benzyl bromide, alkenyl bromides or -chlorides such as, e.g., allyl chloride, allyl bromide, methallyl chloride or methallyl bromide.

The reaction is performed in the presence of acid acceptors such as, e.g., sodium carbonate, sodium hydroxide, potassium hydroxide, and in solvents such as, e.g., alcohols, ketones, dimethylacetamide or mixtures thereof with water, at temperatures of 20° – 150°C, preferably 40° – 120°C.

The compounds of the general formula I can also be obtained by reacting, by methods known per se, isophthalic acid chloride or 5-chloroisophthalic acid chloride, in the present of Friedel-Craft's catalysts, wich resorcin mono- or -dialkyl ethers. The following compound can, for example, be used: resorcin dihexyl ether.

With the use of resorcin dialkyl ethers, especially in heating to higher temperatures, there usually very readily occurs a dealkylation of the alkoxy groups which are in the o-position to the carbonyl groups. These compounds can be further dealkylated to a compound of the formula I wherein $R_1$ is hydrogen.

The compounds of the general formula I can also be obtained by reacting, in a manner known per se. e.g., isophthalic acid chloride with resorcin monoalkyl ethers, to give di-esters and transposing these, in the presence of Friedel-Craft's catalysts, preferably aluminum chloride, to the desired compounds which can be further dealkylated to compounds of the formula I wherein R is hydrogen.

The following examples illustrate the invention. The temperatures are given in degrees Centigrade and the absorptivity (a) is defined as follows:

$$a = \log (I_o/I)/C \cdot d$$

whereby
$I_o$ represents the intensity of the incident light,
$I$ represents the intensity of the emergent light,
$c$ represents the concentration of absorber in grams per litre of chloroform or dimethyl formamide + 1 percent of acetic acid, and
$d$ represents the layer thickness penetrated by rays in cm.

EXAMPLE 1

A. 304.5 g of isophthalic acid dichloride are dissolved at 5°–10° in 3,600 ml of 1,1,2,2-tetrachloroethane and to the solution are added in portions, at temperatures below 10°, 412 g of commercial powdered aluminium chloride. To the light-yellow suspension are added dropwise within 30 minutes, with stirring and cooling of the suspension to 5°–10°, 414 g of resorcin dimethyl ether. The reaction mixture is gradually heated, whilst being stirred, to 70° internal temperature. At about 60° internal temperature, the initially clear red colour of the reaction solution changes to a yellowish-orange colour and, with simultaneously occurring clouding, the splitting off of hydrochloric acid commences. During the course of the reaction, the reaction mixture changes from an oily suspension to a suspension of solid particles. The internal temperature of 70° is maintained for 45 minutes until the main reaction has subsided and the reaction is completed during 1 hour with an internal temperature of 80°. After cooling the mixture, decomposition is performed with acidified ice water and the solvent is removed by steam distillation. After washing with distilled $H_2O$ and drying of the reaction product, recrystallisation is repeatedly carried out from methyl cellosolve and 1,3-bis(2'-hydroxy-4'-methoxy-benzoyl)-benzene is obtained as light-yellow crystals having a melting point of 165°–166°.

$\lambda_{max} = 332$ nm, $\epsilon = 19,300$

B. 255.9 g of 1,3-bis(2'-hydroxy-4'-methoxy-benzoyl)-benzene are suspended in 2,500 ml of anhydrous benzene and to the suspension are added in portions, at room temperature, 550 g of powdered aluminium chloride. The whole is heated, whilst being stirred, until refluxing is obtained. This temperature is maintained for 2 hours and, after cooling the mixture with ice water/HCl, decomposition is carried out. The solvent is removed by steam distillation, the fine-grained yellow reaction product is filtered off, thoroughly washed with hot water and dried. After recrystallisation from methanol/water, 1,3-bis-(2',4'-dihydroxy-benzoyl)-benzene is obtained as light-yellow crystals having a melting point of 215°–216°

$\lambda_{max} = 325$ nm $\epsilon = 20,500$

C. 35 g of 1,3-bis-(2',4'-dihydroxy-benzoyl)-benzene are dissolved in 150 ml of methanol, 11.8 g of Na-methylate are added, the solution is concentrated by evaporation and the residue again dissolved in 500 ml of dimethylacetamide. Whist stirring the solution, 27.4 g of 1-bromobutane are added dropwise at 20°–40° and, after the addition is completed, the reaction mixture is heated for 4 hours to 80°. After cooling, the reaction mixture is stirred into 1,500 ml of ice water slightly acidified with HCl, the obtained precipitate taken up in ether, the organic phase dried with sodium sulphate and the ether expelled. The residue is taken up in toluene and, as preliminary purification, repeatedly treated hot with fuller's earth. After the solvent has been expelled, the residue is recrystallised from acetonitrile and the 1,3-bis-(2'-hydroxy-4'-butoxy-benzoyl)-benzene is obtained in the form of light-yellow crystals, M.P. 114°–115°.

$\lambda_{max} = 332$ nm, $\epsilon = 21,600$

If, instead of 1-bromobutane, the equivalent amount of other suitable halogen compounds are used, with otherwise the same procedure, the compounds listed in Table I are obtained.

TABLE I

RO—⌬—OH ⌬ HO—⌬—OR with —C(=O)— linkers

| Alkylation agent | R = | F | $\lambda_{max}$ (nm) | Absorptivity $a$ |
|---|---|---|---|---|
| 1-bromoethane | Ethyl | 99–100 | 330 | 51.6 |
| 1-bromopropane | Propyl | 145–146 | 333 | 50.4 |
| 2-bromopropane | Isopropyl | 120–121 | 332 | 50.3 |
| 1-chloropentane | Pentyl | 89–90 | 332 | 43.3 |
| 1-bromohexane | Hexyl | 60 | 332 | 40.9 |
| 1-bromooctane | Octyl | Resin | 331 | 36.2 |
| 1-chlorododecane | Dodecyl | 64–65 | 333 | 32.8 |
| 1-chlorooctadecane | Octadecyl | 75–76 | 333 | 25.2 |
| 1-chloro-3,3-dimethyl propane | 3,3-dimethylpropyl | 95–96 | 332 | 44.5 |
| 1-chloro-3,3-dimethyl butane | 3,3-dimethylbutyl | 141–142 | 332 | 42.6 |
| 1-chloro-2-methyl propene-2 | 2-methylpropenyl-2 | 129–130 | 332 | 45.2 |
| Benzyl chloride | Benzyl | 143–144 | 332 | 40.9 |
| 4-tert.-butyl-benzyl-chloride | 4-tert.-butyl-benzyl | | 332 | 33.8 |

EXAMPLE 2

203 g of isophthalic acid dichloride are dissolved at 5° – 10° in 1,800 ml of nitrobenzene and to this solution are added in portions, at temperatures below 10°, 275 g of powdered aluminium chloride. Into the reaction solution are then added dropwise within 30 minutes, with stirring and cooling to 5° – 10°, 332 g of resorcin diethyl ether and, after the addition is completed, the internal temperature is gradually raised to 70°, whereby at about 60° the splitting off of HCl commences. The main reaction at approximately 70° internal temperature is allowed to subside and the temperature is then raised to 80° to complete the reaction over 1 hour. After the mixture has cooled, decomposition is performed with ice water/HCl and the nitrobenzene removed by steam distillation. After recrystallising the reaction product from acetonitrile, the 1,3-(2'-hydroxy-4'-ethoxy-benzoyl)-benzene is obtained in the form of light-yellow crystals having a melting point of 99° – 100°.

$\lambda_{max} = 330$ nm;  $\epsilon = 20,000$

By using, instead of resorcin diethyl ether, equivalent amounts of resorcin dipropyl ether or resorcin dibutyl ether, with otherwise the same procedure, 1,3-bis-(2'-hydroxy-4'-propoxy-benzoyl)-benzene or 1,3-bis-(2'-hydroxy-4'-butoxy-benzoyl)-benzene is obtained.

EXAMPLE 3

A. 238 g of 5-chloroisophthalic acid dichloride are dissolved in 1,800 ml of 1,1,2,2-tetrachloroethane and to this solution are added in portions, at 5° – 10°, 275 g of powdered aluminium chloride. 270 g of resorcin dimethyl ether are then added dropwise within 30 minutes, at a temperature of below 20°, to the reaction mixture. After the addition is completed, the reaction mixture is heated in the course of 30 minutes to 70° internal temperature, whereby at about 60° the evolution of HCl commences. Simultaneously, the initially practically homogeneous reaction solution changes by way of an oily suspension into a suspension of semi-solid particles. The temperature is maintained at 70° for 1 hour, or until the main reaction has subsided, the internal temperature is raised to 80° and the reaction completed during 1 hour. After cooling, the reaction mixture is decomposed with ice water/HCl and the solvent expelled by steam distillation. After the washing and drying of the reaction product, it is recrystallised from ethylene glycol monomethyl ether and the 1,3-bis-(2'-hydroxy-4'-methoxy-benzoyl)-5-chlorobenzene is obtained in the form of yellow crystals which melt at 170° – 171°.

$\lambda_{max} = 334$ nm;  $\epsilon = 19'800$

If, instead of resorcin dimethyl ether, equivalent amounts of the resorcin ethers, listed in Table II, are used, with the procedure being otherwise the same, the compounds given in Table II are obtained.

TABLE II

RO—⟨⟩—OR

| R= | Compound | $\lambda_{max}$ (nm.) | Absorptivity $a$ |
|---|---|---|---|
| —C₂H₅ | 1,3-bis-(2'-hydroxy-4'ethoxy-benzoyl)-5-chlorobenzene. | 333 | 45.4 |
| —C₄H₉ | 1,3-bis-(2'-hydroxy-4'-butoxy-benzoyl)-5-chlorobenzene. | 334 | 40.2 |
| —C₈H₁₇ | 1,3-bis-(2'-hydroxy-4'-octoxy-benzoyl)-5-chlorobenzene. | 333 | 32.8 |

B. 206.4 g of 1,3-bis-(2'-hydroxy-4'-methoxy-benzoyl)-5-chlorobenzene are suspended in 2,000 ml of anhydrous benzene and to the suspension are added in portions, at room temperature, 400 g of powdered aluminium chloride. The reaction mixutre is heated, whilst being stirred, until refluxing occurs and the temperature is maintained there for 2 hours. After cooling, the reaction mixture is decomposed with ice water/HCl and the solvent expelled by steam distillation. The obtained reaction product is washed with hot water. After drying and recrystallising from methanol/water, the 1,3-bis-(2', 4'-dihydroxybenzoyl)-5-chlorobenzene is obtained in the form of yellowish-white crystals, which melt at 134°.

$\lambda_{max} = 330$ nm;  $\epsilon = 20'700$

C. 38.5 g of 1,3-bis-(2',4'-dihydroxy-benzoyl)-5-chlorobenzene are dissolved in 150 ml of methanol, 11.8 g of sodium methylate are added, the solution is concentrated by evaporation and the residue again dissolved in 550 ml of dimethylacetamide. Whilst the solution is stirred, 27.4 g of 1-bromobutane are added dropwise at 20° – 40° and, after completion of the addition, the reaction mixture is heated for 4 hours to 80°. After cooling, the reaction mixture is stirred into 1,500 ml of ice water, slightly acidified with HCl, and the precipitated reaction product is taken up in ether. After the ethereal solution has been dried, the ether is evaporated off, the residue repeatedly treated hot in toluene solution with fuller's earth and the solvent removed. After recrystallisation of the evaporation residue, the 1,3-bis-(2'-hydroxy-4'-butoxy-benzoyl)-5-chlorobenzene is obtained in the form of light-yellow crystals.

$\lambda_{max} = 334$ nm;  $\epsilon = 29'900$

If, instead of 1-bromobutane, equivalent amounts of the alkylation agents in Table III are used, proceeding otherwise in the same manner, the compounds listed in Table III are obtained.

Table III

| Alkylation agent | Compound | $\lambda_{max}$ (nm) Absorptivity |
|---|---|---|
| 1-bromoethane | 1,3-bis (2'-hydroxy-4'-ethoxy benzoyl)-5-chlorobenzene | 333  45.4 |
| 1-bromopentane | 1,3-bis-(2'-hydroxy-4'-pentoxy-benzoyl)-5-chlorobenzene | 334  38.1 |
| 1-chloro-3,3-dimethyl-butane | 1,3-bis-[2'-hydroxy-4'-(3'', 3''-dimethyl-butoxy)-benzoyl]-5-chloro benzene | 334  36.2 |
| 1-bromododecane | 1,3-bis-(2'-hydroxy-4'-dodecyloxy-benzoyl)-5-chlorobenzene | 333  27.8 |
| benzyl chloride | 1,3-bis-(2'-hydroxy-4'-benzyloxy-benzoyl)-5-chlorobenzene | 334  35.5 |
| 1-chloro-2-methyl propene | 1,3-bis-[2'-hydroxy-4'-(2''-methyl-propenoxy)-benzoyl]-5-chlorobenzene | 334  40.6 |

EXAMPLE 4

A. 350 g of 1,3-bis-(2',4'-dihydroxy-benzoyl)-benzene, 5 g of potassium iodide and 190 g of 1-bromododecane are dissolved in 1,000 ml of dimethylacetamide and, whilst being stirred, heated to 85°. At this temperature, a solution of 49 g of potassium hydroxide in 50 ml of water is added dropwise in the course of 2 hours and, after completion of the addition, the solution is allowed to fully react during a further 3 hours at 90°. The reaction solution is subsequently stirred into 2 litres of acidified ice water and the precipitated reaction product taken up in ether. After drying of the ethereal solution, the ether is evaporated off and the evaporation residue stirred up with 700 ml of ethanol. After cooling and trituration, the 1,3-bis-(2'-hydroxy-4'-dodecyloxy-benzoyl)-benzene, forming as by-product, precipitates out, is filtered off and subsequently washed with a little cold ethanol. 700 ml of water are then gradually added, while stirring proceeds, to the filtrate, whereby, after cooling and trituration, the reaction product gradually crystallises out. After drying and recrystallisation twice from toluene, the 1-(2',4'-dihydroxy-benzoyl)-3-(2''-hydroxy-4''-dodecyloxy-benzoyl)-benzene is obtained in the form of whitish crystals which melt at 137° – 138°.

$\lambda_{max} = 332$ nm; $\epsilon = 1'900$

B. 51.8 g of (2',4'-dihydroxy-benzoyl)-3-(2''-hydroxy-4''-dodecyloxy-benzoyl)-benzene, 1 g of potassium iodide and 13.7 g of 1-bromobutane are dissolved in 150 ml of dimethylacetamide and heated to 80°. To this solution is then added dropwise, in the course of 2 hours, a solution of 6.6 g of potassium hydroxide in 10 ml of water and, after the addition is completed, the whole is heated for a further 3 hours to 90°. The reaction solution is stirred into 500 ml of acidified ice water and the precipitated reaction rpoduct taken up in ether. After drying of the ethereal solution with sodium sulphate, the ether is evaporated off and the residue, with the addition of active charcoal, repeatedly recrystallised from an alcohol/acetone mixture, whereby the 1-(2'-hydroxy-4'-butoxy-benzoyl)-3-(2''-hydroxy-4''-dodecyloxy-benzoyl)-benzene is obtained. M.P. 65 – 66°.

$\lambda_{max} = 333$ nm; $\epsilon = 20'800$

If, instead of 1-bromobutane, the alkylation agents given in Table IV are used, with otherwise the same procedure, then the compounds listed in the table are obtained.

EXAMPLE 5

A solution of 15 g of acetyl cellulose with, on average, 2,5-acetoxy groups per glucose unit, and 0.075 g of one of the UV-absorbers, listed in the following Table V, in 85 g of acetone, is smeared on to a glass plate to form a film. The cellulose acetate films obtained after evaporation of the acetone, are firstly dried at room temperature and then in an oven at 60°. In order to measure the fastness to light of the UV-absorbers, specimens of these 0.04 mm thick UV-filters are exposed for 500 hours in a Fade-O-Meter and tested with regard to their residual UV-absorption. The obtained results are given in the following Table V.

Table V

| No. | UV-Absorber | Absorption still present in % of the original UV-absorption after exposure Range: 300–340 nm |
|---|---|---|
| a | 1,3-bis-(2'-hydroxy-4'-hydroxy-4'-ethoxy-benzoyl)-benzene | 90 |
| b | 1,3-bis-(2'-hydroxy-4'-isopropoxy-benzoyl)-benzene | 95 |
| c | 1,3-bis-(2'-hydroxy-4'-pentoxy-benzoyl)-benzene | 93 |
| d | 1,3-bis-(2'-hydroxy-4'-octoxy-benzoyl)-benzene | 93 |
| e | 1,3-bis-(2'-hydroxy-4'-dodecyloxy-benzoyl)-benzene | 94 |
| f | 1,3-bis-[2'-hydroxy-4'(2''-methylpropenoxy)-benzoyl]-benzene | 96 |
| g | 1,3-bis-[2'-hydroxy-4'-(3'', 3'''-dimethylbutoxy)-benzoyl]-benzene | 96 |
| h | 1,3-bis-(2'-hydroxy-4'-butoxy-benzoyl)-5-chloro-benzene | 92 |
| i | 1,3-bis-(2'-hydroxy-4'-dodecyloxy-benzoyl)-5-chloro-benzene | 95 |
| j | 1,3-bis-(2'-hydroxy-4'-benzyloxy-benzoyl)-benzene | 94 |
| k | 1-(2'-hydroxy-4'-propoxy-benzoyl)-3-(2''-hydroxy-4''-dodecyloxy-benzoyl)-benzene | 92 |
| l | 1-(2'-hydroxy-4'-pentoxy-benzoyl)-3-(2''-hydroxy-4''-dodecyloxy-benzoyl)-benzene | 93 |
| m | 1-(2'-hydroxy-4'-benzyloxy-benzoyl)-3-(2''-hydroxy-4''-dodecyloxy-benzoyl)-benzene | 90 |

Table IV

| Acylation agent | Compound | $\lambda_{max}$ (nm) | Absorptivity |
|---|---|---|---|
| 1-bromopropane | 1-(2'-hydroxy-4'-propoxy-benzoyl)-3-(2''-hydroxy-4''-dodecyloxy-benzoyl)-benzene | 332 | 37.5 |
| 1-bromopentane | 1-(2'-hydroxy-4'-pentoxy-benzoyl)-3-(2''-hydroxy-4''-dodecyloxy-benzoyl)-benzene | 333 | 35.3 |
| 1-chloro-3,3-dimethyl butane | 1-[2'-hydroxy-4'-(3'', 3'''-dimethyl-butoxy)-benzoyl]-3-(2''''-hydroxy-4''''-dodecyloxy-benzoyl)-benzene | 333 | 34.8 |
| 1-bromodecane | 1-(2'-hydroxy-4'-decyloxy-benzoyl)-3-(2''-hydroxy-4''-dodecyloxy-benzoyl)-benzene | 332 | 31.9 |
| 1-bromooctadecane | 1-(2'-hydroxy-4'-octadecyloxy-benzoyl)-3-2''-hydroxy-4''-dodecyloxy-benzoyl)-benzene | 333 | 27.4 |
| benzyl chloride | 1-(2'-hydroxy-4'-benzyloxy-benzoyl)-3-2''-hydroxy-4''-dodecyloxy-benzoyl)-benzene | 333 | 34.4 |

EXAMPLE 6

Difficultly inflammable, liquid polyester resin is polymerised at 80°, after addition of 0.25 percent by weight of a UV-absorber in Table VI with 1 percent by weight of benzoyl peroxide, to form 2.5 mm thick plates. The plates are subsequently cured at 120°.

Plates thus produced and exposed to light exhibit appreciably less browning than plates similarly exposed to light but produced without the aforementioned UV-absorbers.

The polyester resin used was produced as follows: A mixture of 343 g of maleic acid anhydride and 428 g of tetrachlorophthalic acid anhydride is added in portions at 80° to a mixture of 170 g of ethylene glycol and 292 g of diethylene glycol. After displacement of the air in the reaction vessel by nitrogen, the temperature is raised within one hour to 150°, then within 9 hours to 210° and thereafter this temperature is maintained for a further hour. The mixture is then cooled to 180°, the vessel is put under vacuum and the pressure slowly reduced to 100 Torr. These conditions are maintained until the acid number of the reaction mixture has fallen to below 50.

100 g of the thus obtained polyester are mixed with 50 g of styrene and the mixture is polymerised under the aforementioned conditions.

Similar results are obtained if, instead of the tetrachlorophthalic acid, the equivalent amount of phthalic acid anhydride is used, although in this case the resulting polyester resin is not difficultly inflammable.

If, in the above described process, the styrene is replaced by methyl methacrylate, then plates are obtained which are, in themselves, less prone to browning and which, moreover, are more easily stabilised.

Example 7

100 parts of methacrylic acid methyl ester, 0.5 parts of a UV-absorber from Table VII and 0.2 parts of lauroyl peroxide are mixed together and polymerised at a temperature of 50° – 70° in the form of plates of 2 mm thickness.

As can be seen from the following table, such plates can be employed as UV-filters.

Table VI

| No. | UV-Absorber | % transmission with 440 nm before exposure | Loss of transmission with 440 nm after 1000 hours Fade-O-Meter exposure |
|---|---|---|---|
|  | none | 88 | 31 |
| a | 1,3-bis-(2'-hydroxy-4'-propoxy-benzoyl)-benzene | 88 | 2.1 |
| b | 1,3-bis-(2'-hydroxy-4'-butoxy-benzoyl)-benzene | 87 | 2.0 |
| c | 1,3-bis-(2'-hydroxy-4'-octoxy-benzoyl)-benzene | 88 | 4.5 |
| d | 1,3-bis-(2'-hydroxy-4'-dodecyloxy-benzoyl)-benzene | 88 | 3.5 |
| e | 1,3-bis-(2'-hydroxy-4'-octadecyloxy-benzoyl)-benzene | 88 | 4.5 |
| f | 1,3-bis-[2'-hydroxy-4'-(2''-methyl-propenoxy)-benzoyl]-benzene | 87 | 1.9 |
| g | 1,3-bis-(2'-hydroxy-4'-benzyloxy-benzoyl-benzene | 88 | 3.7 |
| h | 1,3-bis-(2'-hydroxy-4'-butoxy-benzoyl)-5-chlorobenzene | 87 | 2.2 |
| i | 1,3-bis(2'-hydroxy-4'-dodecyloxy-benzoyl)-5-chlorobenzene | 87 | 3.7 |
| j | 1-(2'-hydroxy-4'-ethoxy-benzoyl)-3-(2''-hydroxy-4''dodecyloxy-benzoyl)-benzene | 88 | 4.1 |
| k | 1-(2'-hydroxy-4'-butoxy-benzoyl)-3-(2''-hydroxy-4''-dodecyloxy-benzoyl)-benzene | 88 | 4.2 |
| l | 1-(2'-hydroxy-4'-octoxy-benzoyl)-3-(2''-hydroxy-4''-dodecyloxy-benzoyl)-benzene | 87 | 4.2 |

Table VII

| No. | UV-Absorber | % transmission of light of the wave length | |
|---|---|---|---|
|  |  | 340 nm | 430 nm |
|  | none | 86 | 92 |
| a | 1,3-bis-(2'-hydroxy-4'-ethoxy-benzoyl)-benzene | <2 | 92 |
| b | 1,3-bis-(2'-hydroxy-4'-butoxy-benzoyl)-benzene | <2 | 92 |
| c | 1,3-bis-[2'-hydroxy-4'-(3'', 3''-dimethylbutoxybenzoyl]-benzene | <2 | 92 |
| d | 1,3-bis-(2'-hydroxy-4'-heptoxy-benzoyl)-benzene | <2 | 92 |
| e | 1,3-bis-(2'-hydroxy-4'-dodecyloxy-benzoyl)-benzene | <2 | 92 |
| f | 1,3-bis-(2'-hydroxy-4'-octadecyloxy-benzoyl)-benzene | <2 | 92 |
| g | 1,3-bis-(2'-hydroxy-4'-benzyloxy-benzoyl)-benzene | <2 | 92 |
| h | 1-(2'-hydroxy-4'-isopropoxy-benzoyl)-3-(2''-hydroxy-4''dodecyl-benzoyl)-benzene | <2 | 92 |
| i | 1-(2'-hydroxy-4'-hexoxy-benzoyl)-3-(2''-hydroxy-4''-dodecyloxy-benzoyl)-benzene | <2 | 92 |
| j | 1-(2'-hydroxy-4'-octadecyloxy-benzoyl)-3-(2''-hydroxy-4''-dodecyloxy-benzoyl)-benzene | <2 | 92 |

Example 8

Films are produced in the usual manner on a two-roller mill from a mixture of:
- 100 parts of suspension polyvinyl chloride (K-value 60),
- 2.5 parts of a dialkyl tin mercaptide stabiliser (Advastab 17 M from the Deutschen Advance Produktion GhbH, Germany)
- 1.0 part of an epoxy stabiliser (Advaplast 39 from the aforementioned firm)
- 1.0 part of a wax, employed as lubricant and processing auxiliary agent (Wax E from the firm Farbwerk Hoechst, Germany) and
- 0.2 parts of a UV-absorber from Table VIII.

Specimens of these films are exposed for 2,000 hours in the Xenotest exposure apparatus and tested with respect to discolourations.

The results are given in Table VIII

If, instead of the aforementioned mixture, the following recipe is used:
- 100 parts of suspension polyvinyl chloride (K-value 62),
- 1.2 parts of a barium-cadmium soap (Mark WS from the S.A. Argus Chemical N.V., Belgium),
- 0.5 parts of an organic phosphite (Mark C from the above firm)
- 1.0 part of a wax (Wax E from Farbwerke Hoechst, Germany) and 0.2 parts of a UV-absorber from Table IX, with otherwise the same procedure, the results given in Table IX are obtained.

Table VIII

| No. | UV-Absorber | Appearance of the exposed specimen |
|---|---|---|
| | none | dark brown discolouration the whole specimen |
| a | 1,3-bis-(2'-hydroxy-4'-ethoxy-benzoyl)-benzene | somewhat yellowish |
| b | 1,3-bis-(b'-hydroxy-4'-pentoxy-benzoyl)-benzene | commencement of yellowing at isolated places |
| c | 1,3-bis-(2'-hydroxy-4'-dodecyloxy-benzoyl)- | isolated yellowish-brown areas |
| d | 1,3-bis-(2'-hydroxy-4'-octadecyloxy-benzoyl)- | at a few places, yellowish-brown discolouration |
| e | 1,3-bis-[2'-hydroxy-4'-(2'-methylpropenoxy)-benzoyl]benzene | slightly yellowish |
| f | 1,3-bis-(2'-hydroxy-4'-butoxy-benzoyl)-5- | at isolated places yellowish |
| g | 1,3-bis-(2'-hydroxy-4'-dodecyloxy-benzoyl)-5-chlorobenzene | commencement of yellowing at isolated points |

Table IX

| No. | UV-Absorber | Appearance of the exposed specimen |
|---|---|---|
| | none | severe browning of the entire specimen |
| a | 1,3-bis-(2'-hydroxy-4'-propoxy-benzoyl)-benzene | at isolated places a little yellowish |
| b | 1,3-bis-(2'-hydroxy-4'-butoxy-benzoyl)-benzene | somewhat yellowish |
| c | 1,3-bis-[2'-hydroxy-4'-(3'',3''-dimethylbutoxy)-benzoyl]-benzene | slight touch of yellow |
| d | 1,3-bis-(2'-hydroxy-4'-benzyloxy-benzoyl)-benzene | yellowish discolouration at isolated places |
| e | 1,3-bis-(2'-hydroxy-4'-dodecyloxy-benzoyl)-5-chlorobenzene | yellowish discolouration |
| f | 1-(2'-hydroxy-4'-ethoxy-benzoyl)-3-(2''-hydroxy-4''-dodecyloxy-benzoyl)-benzene | at isolated places yellowish discolouration |
| g | 1-(2'-hydroxy-4'-octoxy-benzoyl)-3-(2''-hydroxy-4''-dodecyloxy-benzoyl)-benzene | isolated yellowish discolourations |
| h | 1-(2'-hydroxy-4'-benzyloxy-benzoyl)-3-(2''-hydroxy-4''-dodecyloxy-benzoyl)-benzene | at isolated places yellowish discolouration |

EXAMPLE 9

100 parts of polyethylene with a density of 0.917 are homogeneously mixed at 180° in the Brabender-Plastograph with 0.5 parts of a UV-absorber from Table X and 0.5 parts of 3-(3',5'-di-t.butyl—4'-hydroxy-phenyl)-propionic acid-octadecyl ester. The thus obtained mixture is pressed in a platen press at 165° to form 1 mm thick plates.

These plates exhibit after weathering, in the case of bending around 90°, appreciably less proneness to brittleness than plates without the addition of the additives in Table X.

Table X

| No. | UV-Absorber |
|---|---|
| a | 1,3-bis-(2'-hydroxy-4'-ethoxy-benzoyl)-benzene |
| b | 1,3-bis-(2'-hydroxy-4'-propoxy-benzoyl)-benzene |
| c | 1,3-bis-[2'-hydroxy-4'-(2''-methylpropenoxy)-benzoyl]-benzene |
| d | 1,3-bis-(2'-hydroxy-4'-butoxy-benzoyl)-benzene |
| e | 1,3-bis-[2'-hydroxy-4'-(3'',3''-dimethylpropoxy)-benzoyl]-benzene |
| f | 1,3-bis-(2'-hydroxy-4'-hexoxy-benzoyl)-benzene |
| g | 1,3-bis-[2'-hydroxy-4'-(3'',3''-dimethylbutoxy)-benzoyl]-benzene |
| h | 1,3-bis-(2'-hydroxy-4'-octoxy-benzoyl)-benzene |
| i | 1,3-bis-(2'-hydroxy-4'-decyloxy-benzoyl)-benzene |
| j | 1,3-bis-(2'-hydroxy-4'-dodecyloxy-benzoyl)-benzene |
| k | 1,3-bis-(2'-hydroxy-4'-octadecyloxy-benzoyl)-benzene |
| l | 1,3-bis-(2'-hydroxy-4'-benzyloxy-benzoyl)-benzene |
| m | 1,3-bis-(2'-hydroxy-4'-butoxy-benzoyl)-5-chlorobenzene |
| n | 1,3-bis-(2'-hydroxy-4'-dodecyloxy-benzoyl)-5-chlorobenzene |

EXAMPLE 10

100 parts of polypropylene with a density of 0.90 are homogeneously mixed at 220° in the Brabender-Plastograph with 0.5 parts of a UV-absorber from Table XI, 0.2 parts of bis-(5-t.butyl-4-hydroxy-2-methyl-phenyl)-sulphide, 0.2 parts of dilauryl thiodipropionate and 0.2 parts of trioctadecyl phosphite. The thus obtained mixture is pressed in a platen press at 180° to form 1 mm thick plates.

These plates exhibit after weathering, in the case of bending around 90°, appreciably less proneness to brittleness than plates produced otherwise in the same manner, but without addition of the protective agents against light rays given in Table XI.

Table XI

| No. | UV-Absorber |
|---|---|
| a | 1,3-bis-(2'-hydroxy-4'-ethoxy-benzoyl)-benzene |
| b | 1,3-bis-(2'-hydroxy-4'-propoxy-benzoyl)-benzene |
| c | 1,3-bis-[2'-hydroxy-4'-(2''-methylpropenoxy)-benzoyl]-benzene |
| d | 1,3-bis-(2'-hydroxy-4'-butoxy-benzoyl)-benzene |
| e | 1,3-bis-[1'-hydroxy-4'-(3'', 3''-dimethylpropoxy)-benzoyl]-benzene |
| f | 1,3-bis-(2'-hydroxy-4'-hexoxy-benzoyl)-benzene |
| g | 1,3-bis-[2'-hydroxy-4'-(3'', 3''-dimethylbutoxy)-benzoyl]-benzene |
| h | 1,3-bis-(2'-hydroxy-4'-octoxy-benzoyl)-benzene |
| i | 1,3-bis-(2'-hydroxy-4'-decyloxy-benzoyl)-benzene |
| j | 1,3-bis-(2'-hydroxy-4'-dodecyloxy-benzoyl)-benzene |
| k | 1,3-bis-(2'-hydroxy-4'-octadecyloxy-benzoyl)-benzene |
| l | 1,3-bis-(2'-hydroxy-4'-benzyloxy-benzoyl)-benzene |
| m | 1,3-bis-(2'-hydroxy-4'-butoxy-benzoyl)-5-chlorobenzene |
| n | 1,3-bis-(2'-hydroxy-4'-dodecyloxy-benzoyl)-5-chlorbenzene |

EXAMPLE 11

100 parts of polystyrene granulate are mixed dry with 0.3 parts of a protective agent against light rays from Table XII and 0.1 parts of 2,4,6-tri-t.-butyl-phenol and the mixture is sprayed with an injection-moulding machine to form 2 mm thick plates.

The obtained plates are exposed for 1,000 hours in the Xenotest apparatus and subsequently the yellowing of the plates is determined by means of the yellowing factor in the following manner:

$$Y.F. = [\Delta T(420) - \Delta T(680)]/T(560)$$

whereby $\Delta T$ represents the transmission loss occurring during exposure with the wave-lengths 420 and 680 nm and $T(560)$ represents the transmission value in percent of the unexposed specimen in the case of 560 nm.

Table XII

| No. | UV-Absorber | Y.F. |
|---|---|---|
|  | without | 15 |
| a | 1,3-bis-(2'-hydroxy-4'-butoxy-benzoyl)-benzene | 2.1 |
| b | 1,3-bis- [2'-hydroxy-4'-(3'', 3''-dimethylpropoxy)-benzoyl ]-benzene | 2.0 |
| c | 1,3-bis-[2'-hydroxy-4'-(2''-methylpropenoxy)-benzoyl]-benzene | 2.0 |
| d | 1,3-bis-(2'-hydroxy-4'-hexoxy-benzoyl)-benzene | 2.7 |
| e | 1,3-bis-(2'-hydroxy-4'-dodecyloxy-benzoyl)-benzene | 3.5 |
| f | 1,3-bis-(2'-hydroxy-4'-octadecyloxy-benzoyl)-benzene | 3.2 |
| g | 1,3-bis-(2'-hydroxy-4'-benzyloxy-benzoyl)-benzene | 3.1 |
| h | 1-(2'-hydroxy-4'-butoxy-benzoyl)-3-(2''-hydroxy-4''-dodecyloxy-benzoyl)-benzene | 2.5 |
| i | 1-(2'-hydroxy-4'-hexoxy-benzoyl)3-3(2''-hydroxy-4''-dodecyloxy-benzoyl)-benzene | 3.1 |
| j | 1-(2'-hydroxy-4'-decyloxy-benzoyl)-3-(2''-hydroxy-4''-dodecyloxy-benzoyl)-benzene | 3.4 |

EXAMPLE 12

Bleached maple-veneer is coated with a wood varnish having the following composition:

15.0 parts by weight of cellulose acetate (of the firm Bayer in Leverkusen, Germany) with ca. 56% acetic acid content,
10.0 parts by weight of dimethyl glycol phthalate,
1.0 part by weight of 1,3-bis-[2'-hydroxy-4'-dodecyloxy-benzoyl]-benzene
5.0 parts by weight of methyl alcohol,
10.0 parts by weight of toluene and
50.0 parts by weight of ethylacetate.

The natural yellowing of the wood is retarded by this varnish.

EXAMPLE 13

A cosmetic protective agent against light rays is obtained as follows:

5 parts of white ceresine wax
22 parts of white petrolatum
19.5 parts of white mineral oil
15 parts of lanoline anhydrous
2 parts of 1,3-bis-[2'-hydroxy-4'-hexoxy-benzoyl]-benzene
36 parts of water
0.5 parts of perfume.

The ceresine, petrolatum and lanoline are melted together and the protective agent against light rays dissolved in the melt. The mineral oil is then added at 70° and tle water is subsequently slowly stirred in at the same temperature. Stirring is continued until the temperature has fallen below 50°, whereupon the perfume is added.

EXAMPLE 14

A sprayable cosmetic protective agent against light rays is obtained by dissolving in 80 parts of ethanol, 10 parts of ricinic acid methyl ester, 10 parts of oleyl alcohol and 1 part of 1,3-bis-[2'-hydroxy-4'-hexoxy-benzoyl]-benzene. After addition of commercial fluorine-containing propellants (e.g., Freon products of the firm Du Pont, USA), the solution can be sprayed from an aerosol container.

EXAMPLE 15

35 g of 1,3-bis-(2,4--dihydroxy-benzoyl)-benzene are dissolved in 150 ml of metanhol and to the solution are added 5.9 g of sodium methylate. The solution is dried and the residue again dissolved in 500 ml of dimethylacetamide. Whilst the solution is being stirred, 16.5 g of 1-bromohexane are added dropwise at 20° – 40° and, after the addition is completed, the reaction mixture is heated for 4 hours to 80°. After cooling of the reaction mixture, it is stirred into ice water, which is slightly acidified with hydrochloric acid, the obtained precipitate taken up in diethyl ether, the ethereal solution dried and the ether distilled off. The residue is taken up in toluene and repeatedly treated in the hot state with fuller's earth. After the solvent has been distilled off, the residue is treated in the hot state with hexane, whereby unchanged starting product remains behind. After concentration by evaporation of the hexane solution, the residue is recrystallised from xylene and the 1-(2,4-dihydroxy-benzoyl)-3-(2'-hydroxy-4'-hexyloxy-benzoyl)-benzene is obtained in the form of faintly yellow crystals, M.P. 134°–135°. $\lambda_{max} = 332$ nm, $\epsilon = 19,200$.

By using, instead of 1-bomohexane, the equivalent amount of the alkylating agents which are given in Table XIII, with otherwise the same procedure, the compounds listed in Table XIII are obtained.

Table XIII

| Alkylating agent | Compound | $\lambda_{max}$ nm | Absorptivity $a$ |
|---|---|---|---|
| 1-bromo-butane | 1-(2,4-dihydroxy-benzoyl)-3-(2'-hydroxy-4'-butoxy-benzoyl)-benzene | 332 | 47.2 |
| 1-chloro-octane | 1-(2,4-dihydroxy-benzoyl)-3-(2'-hydroxy-4'-octoxy-benzoyl)-benzene | 333 | 41.8 |
| 1-chloro-dodecane | 1-(2,4-dihydroxy-benzoyl)-3-(2'-hydroxy-4'-dodecyloxy-benzoyl)-benzene | 332 | 36.7 |
| 1-bromo-octa-decane | 1-(2,4-dihydroxy-benzoyl)-3-(2'-hydroxy-4'-octadecyloxy-benzoyl)-benzene | 332 | 32.0 |
| benxyl chloride | 1-(2,4-dihydroxy-benzoyl)-3-(2'-hydroxy-4'-benzyloxy-benzoyl)-benzene | 333 | 43.5 |
| methallyl chloride | 1-(2,4-dihydroxy-benzoyl)-3-(2'-hydroxy-4'-methallyloxy-benzoyl)-benzene | 333 | 47.9 |
| allyl chloride | 1-(2,4-dihydroxy-benzoyl)-3-(2'-hydroxy-4'-allyloxy-benzoyl)-benzene | 333 | 48.3 |
| 4-methyl-benzyl chloride | 1-(2,4-dihydroxy-benzoyl)-3-[2'-hydroxy-4'-(4-methyl-benzyloxy)-benzoyl]-benzene | 333 | 43.1 |

By using, instead of 1,3-bis-(2,4-dihydroxy-benzoyl)-benzene, the equivalent amount of 1,3-bis-(2,4-dihydroxy-benzoyl)-5-chlorobenzene, with otherwise the same procedure, the compounds listed in Table XIV are obtained.

Table XIV

| Alkylating agent | Compound | $80_{max}$ nm | Absorptivity $a$ |
|---|---|---|---|
| 1-bromopropane | 1-(2,4-dihydroxy-benzoyl)-3-(2'-hydroxy-4'-propoxy)-5-chlorobenzene | 334 | 46.7 |
| 1-chloro-pentane | 1-(2,4-dihydroxy-benzoyl)-3-(2'-hydroxy-4'-pentoxy)-5-chlorobenzene | 335 | 43.7 |
| 1-chloro-3,3-dimethylbutane | 1-(2,4-dihydroxy-benzoyl)-3-[2'-hydroxy-4'-(3'',3''-dimethylbutoxy]-5-chlorobenzene | 334 | 42.6 |
| 1-bromooctane | 1-(2,4-dihydroxy-benzoyl)-3-(2'-hydroxy-4'-octoxy)-5-chlorobenzene | 334 | 39.9 |
| 1-chlorotetra decane | 1-(2,4-dihydroxy-benzoyl)-3-(2'-hydroxy-4'-tetradecyloxy)-5-chlorobenzene | 335 | 35.0 |
| 1-bromoocta decane | 1-(2,4-dihydroxy-benzoyl-3-2'-hydroxy-4'-octadecyloxy)-5-chlorobenzene | 334 | 31.5 |
| benzyl bromide | 1-(2,4-dihydroxy-benzoyl)-3-(2'-hydroxy-4'-benzyloxy)-5-chlorobenzene | 334 | 42.3 |
| methallyl chloride | 1((2,4-dihydroxy-benzoyl)-3-[2'-hydroxy-4'(2''-methylpropenoxy) ]-5-chloro-benzene | 334 | 45.2 |

EXAMPLE 16

52.2 g of 1,3-bis-(2,4-dihydroxy-benzoyl)-benzene are dissolved in a mixture of 75 ml of 2N sodium carbonate solution and 32 ml of 5N sodium hydroxide solution. To the solution are then added at 60° – 70° within a quarter of an hour, whilst stirring is maintained, 19 g of dimethyl sulphate. Stirring proceeds for a further 5 hours at 70° – 80° internal temperature and, after cooling, the reaction mixtue is poured into ice water. After acidification with dilute hydrochloric acid, the residue is filtered off, thoroughly washed with distilled water, dried and repeatedly treated in the hot state with toluene and fuller's earth. Any starting material present thereby remains undissolved. After concentration of the toluene solution, it is repeatedly recrystallised from toluene/acetonitrile and the 1-(2,4-dihydroxy-benzoyl)-3-(2'-hydroxy-4'-methoxy-benzoyl)-benzene is obtained in the form of light yellow crystals which melt at 180°.

$\lambda_{max} = 332$ nm    $\epsilon = 19800$.

If, instead of dimethyl sulphate, the equivalent amount of diethyl sulphate is used, with otherwise the same procedure, the 1-(2,4-dihydroxy-benzoyl)-3-(2'-hydroxy-4'-ethoxy-benzoyl)-benzene is obtained.

$\lambda_{max} = 333$ nm    $\epsilon = 20100$.

EXAMPLE 17

A solution of 15 g of acetyl cellulose with, on average, 2.5-acetoxy groups per glucose unit, and 0.075 g of a UV-absorber, given in the following Table XV, in 85 g of acetone is smeared on to a glass plate to form a film. The cellulose acetate films, obtained after evaporation of the acetone, are firstly dried at room temperature and then in an oven at 60°. Specimens of these 0.04 mm thick UV-filters are exposed, in order to measure the fastness to light of the UV-absorbers, for 500 hours in the Fade-O-Meter and tested with respect to their residual UV-absorption. The obtained results are given in Table XV.

Table XV

| No. | UV-Absorber | Absorption still present in % of the original UV-absorption after exposure Range: 300–340 nm |
|---|---|---|
| a | 1-(2,4-dihydroxy-benzoyl)-3-(2'-hydroxy-4'-butoxy-benzoyl)-benzene | 95 |
| b | 1-(2,4-dihydroxy-benzoyl)-3-(2'-hydroxy-4'-hexoxy-benzoyl)-benzene | 96 |
| c | 1-(2,4-dihydroxy-benzoyl)-3-(2'-hydroxy-4'-decyloxy-benzoyl)-benzene | 94 |
| d | 1-(2,4-dihydroxy-benzoyl)-3-(2'-hydroxy-4'-octadecyloxy-benzoyl)-benzene | 96 |
| e | 1-(2,4-dihydroxy-benzoyl)-3-(2'-hydroxy-4'-benzyloxy-benzoyl)-benzene | 97 |
| f | 1-(2,4-dihydroxy-benzoyl)-3-[2'-hydroxy-4'-(2''-methyl-propenoxy)-benzoyl]-benzene | 93 |
| g | 1-(2,4-dihydroxy-benzoyl)-3-(2'-hydroxy-4'-methoxy-benzoyl)-5-chlorobenzene | 96 |
| h | 1-(2,4-dihydroxy-benzoyl)-3-(2'-hydroxy-4'-pentoxy-benzoyl)-5-chlorobenzene | 92 |
| i | 1-(2,4-dihydroxy-benzoyl)-3-(2'-hydroxy-4'-octoxy-benzoyl)-5-chlorobenzene | 94 |
| j | 1-(2,4-dihydroxy-benzoyl)-3-(2'-hydroxy-4'-dodecyloxy-benzoyl)-5-chlorobenzene | 92 |

EXAMPLE 18

Difficultly inflammable, liquid polyester resin is polymerised at 80°, after addition of 0.25 percent by weight of a UV-absorber, given in Table XVI, with 1 percent by weight of benzoyl peroxide, to form 2.5 mm thick plates. The plates are afterwards cured at 120°.

Plates produced in this manner and exposed to light exhibit appreciably less browning than plates similarly exposed to light but produced without the aforementioned UV-absorbers.

The employed polyester resin was produced as follows: A mixture of 343 g of maleic acid anhydride and 428 g of tetrachlorophthalic acid anhydride is added in portions at 80° to a mixture of 170 g of ethylene glycol and 292 g of diethylene glycol. After explusion of the air in the reaction vessel by nitrogen, the temperature is raised over one hour to 150°, then over 9 hours to 210° and thereafter maintained at this level for a further hour. The mixture is then cooled to 180°, the vessel is put under vacuum and the pressure slowly reduced to 100 Torr. These conditions are maintained until the acid number of the reaction mixture has fallen below 50.

100 g of the thus obtained polyester are mixed with 50 g of styrene and the mixture is polymerised under the aforementioned conditions.

Similar results are obtained if, instead of the tetrachlorophthalic acid, the equivalent amount of phthalic acid anhydride is used, although, in this case, the resulting polyester resin is not difficultly inflammable.

If, in the above described process, the stryrene is replaced by methyl methacrylate, then plates are obtained which are, in themselves, less prone to browning and which, moreover, are more easily stabilised.

Table XVI

| Nr. | UV-Absorber | % Transmission with 440 nm before exposure | % Transmission loss with 440 nm after 1000 hours Fade-O-Meter exposure |
|---|---|---|---|
| — | none | 88 | 31 |
| a | 1-(2,4-dihydroxy-benzoyl)-3-2'-hydroxy-4'-butoxy-benzoyl)-benzene | 88 | 2.1 |
| b | 1-(2,4-dihydroxy-benzoyl)-3-(2'-hydroxy-4'-octoxy-benzoyl)-benzene | 88 | 2.4 |

Table XVI

| Nr. | UV-Absorber | % Transmission with 440 nm before exposure | % Transmission loss with 440 nm after 1000 hours Fade-O-Meter exposure |
|---|---|---|---|
| c | 1-(2,4-dihydroxy-benzoyl)-3-(2'-hydroxy-4'-dodecyloxy-benzoyl)-benzene | 87 | 1.9 |
| d | 1-(2,4-dihydroxy-benzoyl)-3-(2'-hydroxy-4'-octadecyloxy-benzoyl)-benzene | 88 | 2.5 |
| e | 1-(2,4-dihydroxy-benzoyl)-3-2'-hydroxy-4'-benzyloxy-benzoyl)-benzene | 88 | 2.3 |
| f | 1-(2,4-dihydroxy-benzoyl)-3-(2'-hydroxy-4'-methoxy-benzoyl)-benzene | 88 oxy-benzoyl)- | 2.0 |

EXAMPLE 19

100 parts of methacrylic acid methyl ester, 0.5 parts of a UV-asborber in Table XVII and 0.2 parts of lauroyl peroxide are mixed together and polymerised at a temperature of 50°–70° in the form of plates of 2 mm thickness.

As can be seen from the following table, such plates can be used as UV-filters.

Table XVII

| No. | UV-Absorber | % transmission of light of the wave length | |
|---|---|---|---|
| | | 340 nm | 430 nm |
| — | without | 86 | 92 |
| a | 1-(2,4-dihydroxy-benzoyl)-3-(2'-hydroxy-4'-butoxy-benzoyl)-benzene | <2 | 92 |
| b | 1-(2,4-dihydroxy-benzoyl)-3-(2'-hydroxy-4'-hexoxy-benzoyl)-benzene | <2 | 92 |
| c | 1-(2,4-dihydroxy-benzoyl)-3-(2'-hydroxy-4'-dodecyloxy-benzoyl)-benzene | <2 | 92 |
| d | 1-(2,4-dihydroxy-benzoyl)-3-(2'-hydroxy-4'-octadecyloxy-benzoyl)-benzene | <2 | 92 |
| e | 1-(2,4-dihydroxy-benzoyl)-3-(2'-hydroxy-4'-(2'-methylpropenoxy-benzoyl)-benzene | <2 | 92 |
| f | 1-(2,4-dihydroxy-benzoyl)-3-(2'-hydroxy-4'-benzyloxy-benzoyl)-benzene | <2 | 92 |

EXAMPLE 20

Films are produced in the usual manner on a two-roller mill from a mixture of:

100 parts of suspension polyvinyl chloride (K-value 60), 2.5 parts of a dialkyl tin mercaptide stabiliser (Advastab 17 M of the Deutschen Advance Production GmbH, Germany)

1.0 part of an epoxy stabiliser (Advaplast 39 of the aforementioned firm), 1.0 part of a wax, used as lubricant and processing auxiliary agent (Wax E of the firm Farbwerke Hoechst, Germany) and 0.2 parts of a UV-absorber in Table XVIII.

Specimens of these films are exposed for 2,000 hours in the Xenotest exposure apparatus and tested with respect to discolourations. The results are given in Table XVIII.

Table XVIII

| No. | UV-Absorber | Appearance of the exposed specimen |
|---|---|---|
| — | without | dark brown discolouration of the whole specimen |
| a | 1-(2,4-dihydroxy-benzoyl)-3-(2'-hydroxy-4'-ethoxy-benzoyl)-benzene | slight yellow tint |
| b | 1-(2,4-dihydroxy-benzoyl)-3-(2'-hydroxy-4'-decyloxy-benzoyl)-benzene | yellowish spots at isolated places |
| c | 1-(2,4-dihydroxy-benzoyl)-3-(2'-hydroxy-4'-benzyloxy-benzoyl)-benzene | yellowish spots at isolated places |

If, instead of the aforementioned mixture, the following recipe is used:

100 parts of suspension polyvinyl chloride (K-value 62), 1.2 parts of a barium-cadmium soap (Mark WS of the S.A. Argus Chemical N.V., Belgium), 0.5 parts of an organic phosphite (Mark C of the above firm), 1.0 parts of a wax (Wax E of the Farbwerke Hoechst, Germany) and 0.2 parts of a UV-absorber in Table XIX, with otherwise the same procedure, the results given in Table XIX are obtained:

Table XIX

| No. | UV-Absorber | Appearance of the exposed specimen |
|---|---|---|
| | none | severe browning of the whole specimen |
| a | 1-(2,4-dihydroxy-benzoyl)-3-(2'-hydroxy-4'-butoxy-benzoyl-benzene | slight yellowing at isolated places |
| b | 1-(2,4-dihydroxy-benzoyl)-3-(2'-hydroxy-4'-octoxy-benzoyl)-benzene | somewhat yellowish |
| c | 1-(2,4-dihydroxy-benzoyl)-3-(2'-hydroxy-4'-dodecyloxy-benzoyl)-benzene | yellowish |

EXAMPLE 21

100 parts of polyethylene with a density of 0.917 are homogeneously mixed at 180° in the Brabender-Plastograph with 0.5 parts of a UV-absorber in Table XX and 0.5 parts of 3-(3,5-di-t.butyl-4-hydroxyphenyl)-propionic acid octadecyl ester. The thus obtained mixture is pressed in a platen press at 165° to form 1 mm thick plates.

After weathering, these plates exhibit, in the case of bending around 90°, appreciably less proneness to brittleness than plates without the addition of the additives in Table XX.

Table XX

| No. | UV-Absorber |
|---|---|
| a | 1-(2,4-dihydroxy-benzoyl)-3-(2'-hydroxy-4'-hexoxy-benzoyl)-benzene |
| b | 1-(2,4-dihydroxy-benzoyl)-3-(2'-hydroxy-4'-octoxy-benzoyl)-benzene |
| c | 1-(2,4-dihydroxy-benzoyl)-3-(2'-hydroxy-4'-dodecyloxy-benzoyl)-benzene |
| d | 1-(2,4-dihydroxy-benzoyl)-3-(2'-hydroxy-4'-octadecyloxy-benzoyl)-benzene |

If, instead of the aforementioned phenolic antioxidant, an equal amount of 3,5-di-t.butyl-4-hydroxy-benzyl-di-octadecyl-phosphonate is used, with otherwise the same procedure, similar results are obtained.

EXAMPLE 22

100 parts of polypropylene with a density of 0.90 are homogeneously mixed at 220° in the Brabender-Plastograph with 0.5 parts of a UV-absorber in Table XXI, 0.2 parts of bis-(5-t.butyl-4-hydroxy-2-methylphenyl)-sulphide, 0.2 parts of dilauryl thiodipropionate and 0.2 parts of triactadecyl phosphite. The thus obtained mixture is pressed in a platen press at 180° to form plates of 1 mm thickness.

After weathering, these plates exhibit, in the case of bending around 90°, appreciably less proneness to brittleness than plates produced otherwise in the same manner, but without addition of the protective agent against light rays given in Table XXI.

Table XXI

| No. | UV-Absorber |
|---|---|
| a | 1-(2,4-dihydroxy-benzoyl)-3-(2'-hydroxy-4'-pentoxybenzoyl)-benzene |
| b | 1-(2,4-dihydroxy-benzoyl)-3-(2'-hydroxy-4'-decyloxy-benzoyl)-benzene |
| c | 1-(2,4-dihydroxy-benzoyl)-3-(2'-hydroxy-4'-tetradecyloxy-benzoyl)-benzene |
| d | 1-(2,4-dihydroxy-benzoyl)-3-(2'-hydroxy-4'-octadecyloxy-benzoyl)-benzene |
| e | 1-(2,4-dihydroxy-benzoyl)-3-(2'-hydroxy-4'-benzyloxy-benzoyl)-benzene |

EXAMPLE 23

100 parts of polystyrene granulate are mixed dry with 0.3 parts of a protective agent against light rays, listed in Table XXII, and 0.1 parts of 2,4,6-tri-t.butyl-phenol and the mixture is sprayed with an injection moulding machine to form 2 mm thick plates.

The obtained plates are exposed for 1,000 hours in the Xenotest apparatus and subsequently the yellowing of the plates is determined by means of the yellowing factor in the following manner:

Y.F. = $[\Delta T(420) - \Delta T(680)]/[T(560)]100$, whereby $\Delta T$ represents the transmission loss occurring during exposure with the wave-lengths 420 and 680 nm, and $T(560)$ represents the transmission value in percent of the unexposed specimen in the case of 560 nm.

Table XXII

| No. | UV-Absorber | V.F. |
|---|---|---|
|  | without | 15 |
| a | 1-(2,4-dihydroxy-benzoyl)-3-(2'-hydroxy-4'-hexoxy-benzoyl)-benzene | 1.9 |
| b | 1-(2,4-dihydroxy-benzoyl)-3-(2'-hydroxy-4'-octyloxy-benzoyl)-benzene | 2.1 |
| c | 1-(2,4-dihydroxy-benzoyl)-3-(2'-hydroxy-4'-dodecyloxy-benzoyl)-benzene | 2.4 |
| d | 1-(2,4-dihydroxy-benzoyl)-3-(2'-hydroxy-4'-benzyloxy-benzoyl)-benzene | 2.3 |

EXAMPLE 24

Bleached maple-veneer is coated with a wood varnish having the following composition:

- 15.0 parts by weight of cellulose acetate (of the Firma Bayer in Leverkusen, Germany) having ca. 56% acetic acid content,
- 10.0 parts by weight of dimethyl glycol phthalate,
- 1.0 part by weight of 1-(2,4-dihydroxy-benzoyl)-3-(2'-hydroxy-4'-hexoxy-benzoyl)-benzene,
- 5.0 parts by weight of methyl alcohol,
- 10.0 parts by weight of toluene and
- 50.0 parts by weight of ethyl acetate.

The natural yellowing of the wood is retarded by this varnish.

EXAMPLE 25

A cosmetic protective agent against light rays is obtained as follows:

- 5 parts of white ceresine wax,
- 22 parts of white petrolatum,
- 19.5 parts of white mineral oil,
- 15 parts of lanoline anhydrous
- 2 parts of 1-(2,4-dihydroxy-benzoyl)-3-(2'-hydroxy-4'-ethoxy-benzoyl)-benzene,
- 36 parts of water,
- 0.5 parts of perfume.

The ceresine, petrolatum and lanoline are melted together and the protective agent against light rays dissolved in the melt. The mineral oil is then added at 70° and, subsequently, the water is slowly stirred in at the same temperature. Stirring is continued until the temperature has fallen below 50°, whereupon the perfume is added.

EXAMPLE 26

A sprayable cosmetic protective agent against light rays is obtained by dissolving in 80 parts of ethanol, 10 parts of ricinic acid methyl ester, 10 parts of oleyl alcohol and 1 part of 1-(2,4-dihydroxy-benzoyl)-3-(2'-hydroxy-4'-butoxy-benzoyl)-benzene. After addition of the commercial fluorine-containing propellants (e.g., Freon products of the firm Du Pont, USA), the solution can be sprayed from an aerosol container.

What we claim is:

1. The compound 1,3-bis-(2'-hydroxy-4'-hexoxy-benzoyl)-benzene.

2. The compound 1,3-bis-(2'-hydroxy-4'-octoxy-benzoyl)-benzene.

3. The compound 1,3-bis-(2'-hydroxy-4'-dodecyloxy-benzoyl)-benzene.

4. The compound 1,3-bis-[2'-hydroxy-4'-(2''-methylpropenoxy)-benzoyl]-benzene.

5. The compound 1,3-bis-(2'-hydroxy-4'-octadecyloxy-benzoyl)-benzene.

6. The compound 1,3-bis-{2'-hydroxy-4'-(3,3-dimethylpropyloxy) benzoyl}-benzene.

7. The compound 1,3-bis-(2'-hydroxy-4'-benzyloxybenzoyl)-benzene.

8. The compound 1,3-bis-{2'-hydroxy-4'-(4-tert-butylbenzyloxy) benzoyl}-benzene.

* * * * *